US012094379B2

(12) United States Patent
Seo et al.

(10) Patent No.: US 12,094,379 B2
(45) Date of Patent: Sep. 17, 2024

(54) DETECTION OF A MALFUNCTIONING DISPLAY USING POWER MEASUREMENT

(71) Applicant: HARMAN INTERNATIONAL INDUSTRIES, INCORPORATED, Stamford, CT (US)

(72) Inventors: Junghoon Seo, Seoul (KR); Chulmin Lee, Gyeonggi-do (KR); Kugjin Cho, Seoul (KR); Daehyoun Byoun, Seoul (KR)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/839,885

(22) Filed: Jun. 14, 2022

(65) Prior Publication Data

US 2023/0401986 A1 Dec. 14, 2023

(51) Int. Cl.
*G09G 3/00* (2006.01)
*B60K 35/00* (2024.01)
*B60K 35/23* (2024.01)
*B60K 35/81* (2024.01)
*B60K 35/90* (2024.01)
*G09G 3/34* (2006.01)

(52) U.S. Cl.
CPC ............ *G09G 3/006* (2013.01); *B60K 35/00* (2013.01); *G09G 3/3426* (2013.01); *B60K 35/23* (2024.01); *B60K 35/81* (2024.01); *B60K 35/90* (2024.01); *B60K 2360/332* (2024.01); *B60Y 2200/11* (2013.01); *G09G 2330/08* (2013.01); *G09G 2330/12* (2013.01); *G09G 2380/10* (2013.01)

(58) Field of Classification Search
CPC .. G09G 3/006; G09G 3/3426; G09G 2330/08; G09G 2330/12; G09G 2380/10; B60K 35/00; B60K 2370/1529; B60K 2370/95; B60K 2370/332; B60K 2370/52; B60Y 2200/11
See application file for complete search history.

(56) References Cited

U.S. PATENT DOCUMENTS

| 9,837,006 | B2* | 12/2017 | Hwang | G09G 3/006 |
| 11,430,408 | B1* | 8/2022 | Chaiken | G09G 3/3406 |
| 2006/0284575 | A1* | 12/2006 | Shen | H05B 41/2822 |
| | | | | 315/312 |
| 2009/0189843 | A1 | 7/2009 | Han et al. | |
| 2014/0028650 | A1* | 1/2014 | Bae | G06F 3/038 |
| | | | | 345/212 |
| 2014/0139143 | A1* | 5/2014 | Navabi-Shirazi | G06F 1/26 |
| | | | | 315/310 |
| 2016/0351118 | A1* | 12/2016 | Knepper | G09G 3/3233 |
| 2018/0151131 | A1* | 5/2018 | Files | G09G 3/342 |
| 2021/0103455 | A1 | 4/2021 | Peter et al. | |

FOREIGN PATENT DOCUMENTS

WO 2020/105427 A1 5/2020

\* cited by examiner

*Primary Examiner* — Doon Y Chow
(74) *Attorney, Agent, or Firm* — Artegis Law Group, LLP

(57) ABSTRACT

In various embodiments, a computer-implemented method comprises measuring a current drawn by a display panel, determining whether the current exceeds a threshold value, and upon determining that the current exceeds the threshold value, causing a light source associated with the display panel to shut off.

19 Claims, 4 Drawing Sheets

| Interface Configuration 302 | Display Area Ratio 304 | Threshold Value 306 |
|---|---|---|
| Partial Interface | 5% | 3.3 mA |
| Full Interface | 20% | 4.4 mA |
| White | 100% | 5 mA |

DETECTION OF A MALFUNCTIONING DISPLAY USING POWER MEASUREMENT

BACKGROUND

Field of the Various Embodiments

Embodiments of the present disclosure relate generally to augmented reality devices and, more specifically, to detection of a malfunctioning display using power measurement.

DESCRIPTION OF THE RELATED ART

Vehicles typically include various interfaces to provide information to occupants of the vehicle. For example, a conventional vehicle can include various mechanical and electronic displays that provide information to the driver. These displays are usually integrated into an interior surface of a vehicle and thus require the driver to look away from the windshield, distracting the driver. As a result, some drivers may become fatigued and/or be distracted from paying attention to the environment outside the vehicle when continually shifting focus between a view of the road through the windshield and a view of the displays in other areas of the vehicle.

To address these issues, some vehicles include systems that provide various types of heads-up displays (HUDs). For example, a HUD system may include a projection system that projects an image onto a portion of the windshield. The image reflects off of the windshield towards the eyes of the driver. The driver views the reflected light as an image, such as a virtual object located at a position within a three-dimensional space. However, such projection systems can cause safety issues for a driver when operating the vehicle. For example, the projection system can display overlays over portions of the windshield when functioning correctly. When the HUD system malfunctions, the projection system may instead display contents over a large area of the windshield, obstructing the driver's view of a large portion of the environment. Such obstructed views can be a major hazard that negatively affects the ability of the driver to safely navigate the vehicle.

Some conventional HUD systems include detection systems to determine whether the projection system is malfunctioning. For example, some conventional HUD systems are connected to interior-facing image sensors that acquire image data of the HUD display reflected by the windshield. A controller compares the acquired image data with reference images of a properly-functioning HUD display to determine whether the projection system is malfunctioning. One drawback with such systems is that the HUD systems require expensive cameras to monitor the windshield. Further, such systems use a controller to continually perform image analysis techniques in order to identify discrepancies between the reference images and the acquired image data. Such image analysis techniques are slow to execute and consume large amounts of power, also adding to the costs of HUD systems. In addition, such systems can be confused by bright light levels exterior to the vehicle.

In light of the above, more effective techniques are needed for managing HUD systems.

SUMMARY

In various embodiments, a computer-implemented method comprises measuring a current drawn by a display panel, determining whether the current exceeds a threshold value, and upon determining that the current exceeds the threshold value, causing a light source associated with the display panel to shut off.

Further embodiments provide, among other things, non-transitory computer-readable storage media storing instructions for implementing the method set forth above, as well as a system configured to implement the method set forth above.

At least one technological advantage of the disclosed techniques relative to the prior art is that, with the disclosed techniques, a HUD system can closely monitor critical failures associated with functionalities of a display panel in a manner that does not require external sensors, such as one or more image sensors. As a result, a HUD system that implements the disclosed techniques can effectively determine malfunctions quicker and in a less processor-intensive manner while avoiding problems associated with detecting discrepancies between images. In addition, the disclosed techniques can identify HUD system failures without using light sensors, which can confuse bright light levels exterior to the vehicle as a HUD system failure. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a diagram of an example lookup table included in the HUD system of FIG. 1, according to various embodiments of the present disclosure.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Overview

Embodiments disclosed herein include a heads-up display system that includes a HUD controller that controls the operation of components used to project an image onto a windshield of a vehicle. A current monitoring unit measures a current that a display panel draws when displaying an image. A current monitoring application receives the current measurement and compares the current measurement to a threshold value associated with a correctly-functioning display panel drawing current from a power source. When the current monitoring application determines that the current measurement exceeds the threshold value, the current monitoring application determines that the display panel is malfunctioning.

Upon determining that the display panel is malfunctioning, the current monitoring application generates an indication message and transmits the indication message to the HUD controller. The HUD controller responds to the indication message by generating a set of commands. The set of commands can include a shutdown command to stop providing power to a light source associated with the display panel. The set of commands can also include a reset command to reset the display panel. The commands cause the display panel to reset. In various embodiments, the display panel can reset in real-time while the driver is operating the vehicle. In such instances, the light source can remain unpowered as the display panel resets.

The HUD system can be implemented in various forms of augmented reality systems, such as spatial augmented reality systems, vehicles, physical rooms, personal computers, and so forth. The HUD system can perform its processing functions using a dedicated processing device and/or a separate computing device, such as a mobile computing device of a user or a cloud computing system. The image projection system can detect the amount of current drawn using any number of sensors, which can be attached to, integrated with other system components, or disposed separately. For example, the current monitoring unit and/or the current monitoring application can be included in a power management integrated circuit that is separate from the HUD controller.

System Overview

Figure 1:
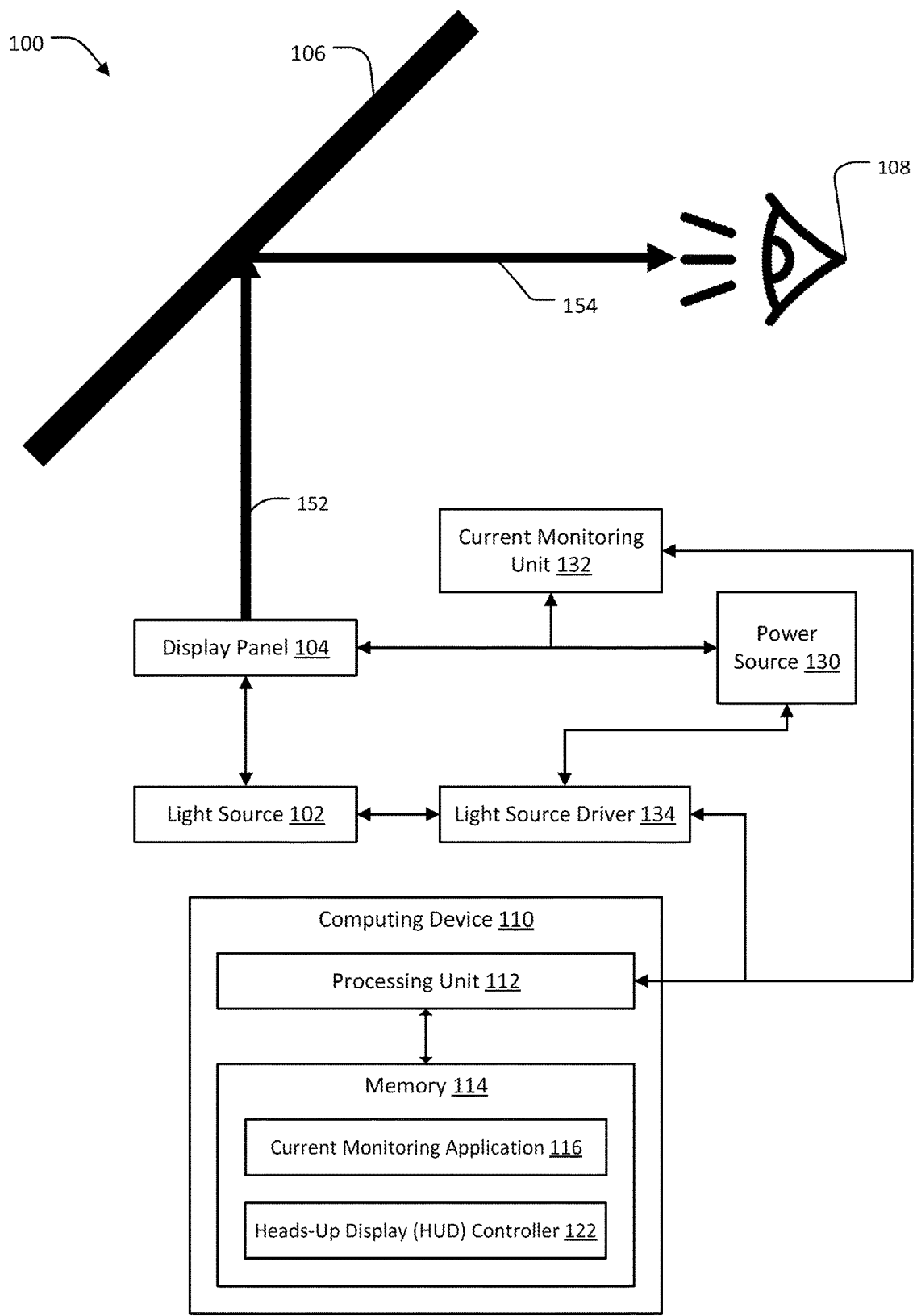
FIG. 1 is a schematic diagram illustration of a heads-up display system, configured to implement one or more aspects of the present disclosure.

FIG. 1 is a schematic diagram illustration of a heads-up display system, configured to implement one or more aspects of the present disclosure. As shown, and without limitation, the HUD system 100 includes a light source 102, a display panel 104, a computing device 110, a windshield 106, a power source 130, a current monitoring unit 132, and a light source driver 134. The computing device 110 includes, without limitation, a processing unit 112 and a memory 114. The memory includes, without limitation, a current monitoring application 116 and a HUD controller 122.

For explanatory purposes, multiple instances of like objects are denoted with reference numbers identifying the object and additional numbers in parentheses identifying the instance where needed. Further, the HUD system 100 can include multiple instances of elements, even when not shown. For example, the HUD system 100 can include multiple light sources (e.g., 102(1), 102(2), 102(3), etc.) and still be within the scope of the disclosed embodiments.

In operation, the HUD controller 122 causes the power source 130 to provide power to the display panel 104 and the light source driver 134 to provide power to the light source 102. The HUD controller 122 provides image data to the display panel 104 and the display panel 104 displays an image. The light source 102 provides a backlight 150 that combines with the image to generate a light pattern 152. The light pattern 152 reflects off the windshield 106 and reaches the eye 108 of the user as the reflected light pattern 154.

The current monitoring unit 132 measures the amount of current that the display panel 104 is drawing. The current monitoring unit 132 generates a signal (e.g., a message, an analog signal, a digital signal, etc.) that includes the current measurement and transmits or otherwise provides the signal to the current monitoring application 116. The current monitoring application 116 receives the current measurement from the current monitoring unit 132 and compares the current measurement with a threshold value associated with the current drawn by a correctly-functioning display panel. When the current monitoring unit 132 determines that the current measurement exceeds the threshold value, the current monitoring application 116 generates and transmits an indication message to the HUD controller 122. The HUD controller 122 responds to the indication message by generating a set of commands to shut off the light source 102 and/or reset the display panel 104.

The computing device 110 can include the processing unit 112 and the memory 114. In various embodiments, the computing device 110 can be a device that includes one or more processing units 112, such as a system-on-a-chip (SoC). In various embodiments, the computing device 110 can be a mobile computing device, such as a tablet computer, mobile phone, media player, and so forth that wirelessly connects to other devices in the vehicle. In some embodiments, the computing device 110 can be a head unit or part of a head unit included in a vehicle system. In some embodiments, the computing device 110 can be split among multiple physical devices in one or more locations. For example, one or more remote devices (e.g., cloud servers, remote services, etc.) can perform one or more aspects of the disclosed techniques, such as eye tracking, media generation, and so forth. Additionally or alternatively, the computing device 110 can be a detachable device that is mounted in a portion of a vehicle as part of an individual console. Generally, the computing device 110 can be configured to coordinate the overall operation of the HUD system 100. The embodiments disclosed herein contemplate any technically-feasible system configured to implement the functionality of the HUD system 100 via the computing device 110. The functionality and techniques of the HUD system 100 are also applicable to other types of vehicles, including consumer vehicles, commercial trucks, airplanes, helicopters, spaceships, boats, submarines, and so forth.

The processing unit 112 can include one or more central processing units (CPUs), digital signal processing units (DSPs), microprocessors, application-specific integrated circuits (ASICs), neural processing units (NPUs), graphics processing units (GPUs), field-programmable gate arrays (FPGAs), and so forth. The processing unit 112 generally includes a programmable processor that executes program instructions to manipulate input data and generate outputs. In some embodiments, the processing unit 112 can include any number of processing cores, memories, and other modules for facilitating program execution. For example, the processing unit 112 could receive inputs, such as sensor data from the current monitoring unit 132, and/or inputs from the current monitoring unit 132 (e.g., indication messages), and can generate pixels for display on an output device (e.g., the display panel 104). In some embodiments, the processing unit 112 can be configured to execute the HUD controller 122 and/or the current monitoring application 116 in order to detect whether the display panel 104 is malfunctioning and/or control the operation of the display panel 104 and/or the light source 102.

The memory 114 can include a memory module or collection of memory modules. The memory 114 generally comprises storage chips such as random-access memory (RAM) chips that store application programs and data for processing by the processing unit 112. In various embodiments, the memory 114 can include non-volatile memory, such as optical drives, magnetic drives, flash drives, or other storage. In some embodiments, separate data stores, connected via a network ("cloud storage") can connect to the current monitoring application 116 and/or the HUD controller 122. The current monitoring application 116 and/or the HUD controller 122 within the memory 114 can be executed by the processing unit 112 in order to implement the overall functionality of the computing device 110 and, thus, coordinate the operation of the HUD system 100 as a whole.

The light source 102 can be a component in a display assembly and act as a backlight unit (BLU) for the display panel 104. For example, the light source 102 can be a light-emitting diode (LED) array that provides the backlight 150 for the display panel 104. Alternatively, in some embodiments, the light source 102 can be a laser source that provides one or more light rays to the display panel 104. In various embodiments, the light source 102 can provide the backlight 150 as baseline light level and/or baseline color (e.g., a white light). In such instances, the display panel 104 can combine the image with the backlight 150 to generate the light pattern 152 that reflects off of windshield 106 to produce the content viewed by the user of the HUD system 100.

In various embodiments, the HUD controller 122 can control the operation of the light source 102 by transmitting commands to a light source driver 134 that powers the light source 102. In various embodiments, the light source driver 134 can be a power circuit that controls power that is delivered to the light source 102. In some embodiments, the light source driver 134 can control power provided by the power source 130. Alternatively, the light source driver 134 can include and/or be connected to a separate power source (not shown).

The display panel 104 displays images provided by the HUD controller 122. For example, the display panel 104 can be a thin-film transistor (TFT) liquid crystal display (LCD) panel that displays image data. In various embodiments, the HUD controller 122 can transmit image data and/or video data to the display panel 104. In various embodiments, the display panel 104 can include a set of regions that selectively prevent portions of the backlight 150 provided by the light source 102 from passing through display panel 104. In such instances, the display panel 104 can draw current and consume power provided by the power source to selectively stimulate the materials in the various regions based on the image received from the HUD controller 122 to cause those regions of the display panel 104 to become translucent and/or transparent such that portions of the backlight 150 pass through the display panel 104 and generate the light pattern 152. In various embodiments, the HUD controller 122 can control the display panel 104 to display an image having a certain configuration by providing specific image data to the display panel 104. In such instances, the display panel 104 can consume a specific amount of power when displaying the image. As the display panel 104 displays more information, the display panel 104 draws more current to change a larger subset of regions from an opaque state to a translucent or transparent state.

In some embodiments, the display panel 104 can malfunction by making substantially all of the regions transparent. In such instances, substantially all of the backlight 150 can pass through the display panel 104, where the resulting light pattern 152 provides an opaque screen (e.g., a "white screen"). When the display panel 104 malfunctions in this manner, the light pattern 152 can obscure the vision of the driver and become a hazard to the driver safely operating the vehicle. In such instances, the HUD controller 122 can respond to the malfunctioning display panel 104 by shutting off power to the light source 102 such that the light source 102 does not generate the backlight 150 and the backlight 150 does not pass through the display panel 104. In some embodiments, the HUD controller 122 can shut off power to the light source 102 while the display panel 104 resets.

The power source 130 source provides power to the display panel 104. In some embodiments, the power source 130 could be a vehicle battery that provides electrical power to various components of the vehicle. In some embodiments, the power source can be a dedicated power source. For example, the power source 130 can be a dedicated battery that provides power to the display panel 104. In some embodiments, the power source 130 can be connected to the display panel via an electronic control unit (not shown) that controls the power provided to the display panel 104. In such instances, the electronic control unit can respond to a command provided by the HUD controller 122 by connecting or disconnecting the display panel 104 from the power source 130.

The current monitoring unit 132 measures the current drawn by the display panel 104. In various embodiments, the current monitoring unit 132 can be hardware and/or software that includes a current sensor that continually measures a current flow between the power source 130 and the display panel 104. In some embodiments, the current monitoring unit 132 can be an analog circuit that continually provides a circuit measurement value to the current monitoring application 116 via the processing unit 112. In alternative embodiments, the current monitoring unit 132 can include an analog-to-digital (A/D) converter that provides the current measurement as a digital signal. In other alternative embodiments, the current monitoring unit 132 can periodically transmit the current measurement in a message to the current monitoring application 116, such as in response to a request from the current monitoring application or at regular time intervals.

In some embodiments, the current monitoring unit 132 can be a measuring circuit (e.g., an ammeter, a current sensor, a small resistor over which a voltage drop is detected, etc.) that measures the current that the power source 130 provides to the display panel 104. In such instances, the current monitoring unit 132 can transmit the measurement of the current to the current monitoring application 116. In various embodiments, the current monitoring application 116 can use the current measurement to determine whether the display panel 104 is malfunctioning. Alternatively, in some embodiments, the current monitoring unit 132 can be included in the computing device 110 and/or a separate integrated circuit. For example, the current monitoring unit 132 can be included in a power management integrated circuit (PMIC) that measures the amount of current drawn and/or generates an indication message when the current monitoring unit 132 detects an overcurrent.

The current monitoring application 116 determines whether the display panel 104 is malfunctioning by comparing the current measurement to a threshold value. In various embodiments, the processing unit 112 can execute the current monitoring application 116 to determine a threshold value associated with the display panel 104 drawing an appropriate amount of current to display an image provided by the HUD controller 122. The current monitoring application 116 then use the threshold value to evaluate the current measurement and determine whether the display panel 104 is malfunctioning. Based on the evaluation, the current monitoring application 116 can then generate a message indicating that the display panel 104 is malfunctioning (e.g., setting an overcurrent flag from "0" to "1", generating an interrupt, etc.).

In some embodiments, the threshold value can be a single value. For example, the current monitoring application 116 can set the threshold value as a default value, where the default value corresponds to the largest amount of current that is expected to be drawn by the display panel 104 during the display of images. For example, the threshold value could correspond to a current level corresponding to anywhere between 80%-95% of a maximum current that can be drawn by the display panel 104, such as when the display panel 104 makes substantially all of its surface transparent. Although described the embodiments describe monitoring the current drawn by the display panel 104 using the current monitoring unit 132, the disclosed techniques can equally be applied to other values, including the power consumption of the display panel 104, that are indicative of the display panel 104 malfunctioning.

Additionally or alternatively, in some embodiments, the current monitoring application 116 can correlate the amount of current drawn by the display panel 104 with specific HUD display configurations. In such instances, as shown in Equation 1, the current monitoring application 116 can set the threshold value as a function of the HUD display configuration.

$$\text{Threshold}_I = f(R) \qquad (1)$$

Where the threshold value for the amount of current drawn ($\text{Threshold}_I$) is a function of a display area ratio (R) associated with the display panel 104 displaying a specific HUD display configuration that covers a portion of the overall display area. In various embodiments, the display area ratio can represent the fractional area of the total display area that is occupied with display images. For example, an interface configuration with a full set of display images, such as indicators, icons, and notification windows, can include images that covers 20% of the total display area.

In some embodiments, the current monitoring application 116 can store a lookup table that includes entries specifying display area ratios and/or threshold values for specific HUD display configurations. In such instances, the current monitoring application 116 can identify the HUD display configuration that the display panel 104 is attempting to display. Upon identifying the HUD display configuration, the current monitoring application 116 can refer to the lookup table to determine the corresponding display area ratio and/or the corresponding threshold value to use when determining whether the display panel 104 is malfunctioning. Additionally and/or alternatively, the current monitoring application 116 can use a display area ratio of an image to be displayed to determine the threshold value.

Figure 2:
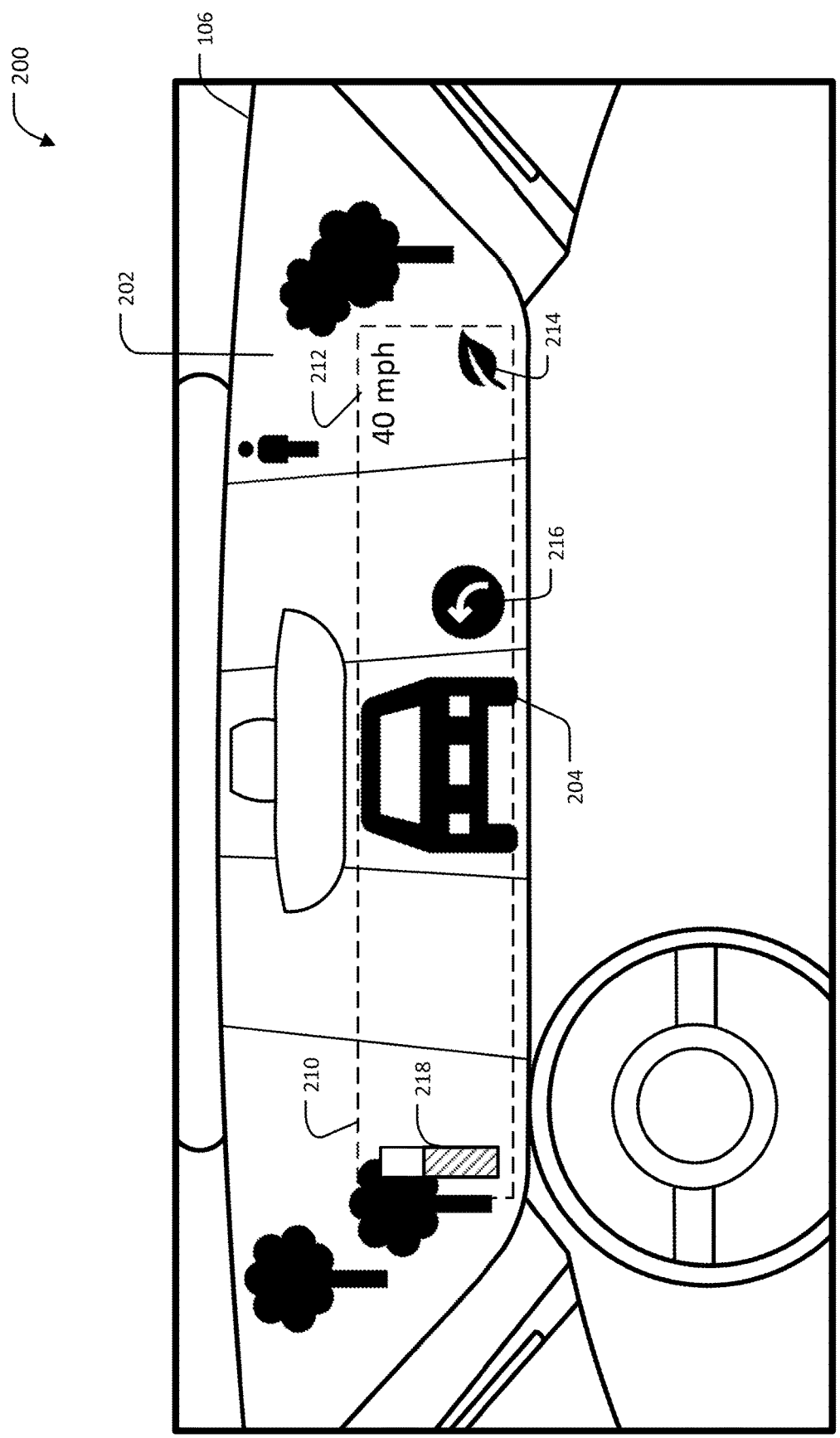
FIG. 2 is a diagram of an example HUD display configuration provided by the HUD system of FIG. 1, according to various embodiments of the present disclosure.

FIG. 2 is a diagram of an example HUD display configuration provided by the HUD system 100 of FIG. 1, according to various embodiments of the present disclosure. As shown, and without limitation, the vehicle interior 200 includes a windshield 106 through which a user (e.g., a driver) can view an environment 202 and content 210 displayed by the HUD system 100. The environment 202 includes, without limitations, one or more vehicles 204. The content 210 includes, without limitation, a speed indicator 212, an ecological efficiency indicator 214, a navigation direction indicator 216, and a fuel gauge indicator 218.

In operation, the HUD controller 122 causes the light source 102 and the display panel 104 to project a light pattern 152 onto the windshield 106. The user sees a reflected light pattern 154 that corresponds to a specific configuration of the content 210 overlayed on the windshield 106. In various embodiments, the light pattern 152 can display the content 210 as an overlay displaying information over at least a portion of the windshield 106 and can provide information associated with the vehicle and/or the environment 202. For example, the content 210 can include a specific interface configuration that includes a group of icons, indicators, message panels, and/or other types of overlays that occupy portions of a total display area.

For example, the content 210 can include various indicators that provide information about the vehicle and/or other information relevant to the user. In one example, the content 210 can include a speed indicator 212 that displays the current speed of the vehicle, an ecological efficiency indicator 214 that indicates whether the vehicle is consuming fuel efficiently, a navigation direction indicator 216 that provides navigational information, a fuel gauge indicator 218 that indicates the remaining fuel available to the vehicle, and/or the like.

In various embodiments, the amount of current drawn by the display panel 104 can be highly correlated to the amount of the display area that the content 210 occupies. For example, when the content 210 has an interface configuration that includes fewer indicators (e.g., displaying only the navigation direction indicator 216), the display panel 104 can draw less current to create the light pattern 152. In such instances, the current monitoring application 116 can set the threshold value lower (e.g., changing the threshold value from 4.5 mA to 3.3 mA) in order to detect partial malfunctions and/or detect complete malfunctions more accurately.

As discussed above, when the display panel 104 malfunctions and changes substantially all of the display regions from opaque to transparent, the light pattern 152 can provide as content 210 a white screen overlay that covers the entire display area. In such instances, the white screen overlay can obstruct the view of the user through the windshield and become a hazard to the user. As the display panel 104 draws maximum current to change all of the display regions to transparent, the light pattern 152 provides a white screen as content 210, which can be correlated with the display panel 104 drawing maximum current from the power source 130. In such instances, the current monitoring application 116 can set a default threshold value to detect system failures as a function of the maximum current that the display panel 104 can draw (e.g., 95% of the maximum power). In such instances, the current monitoring application 116 can use the default threshold value to detect that the display panel 104 is experiencing a complete malfunction.

In some embodiments, the current monitoring application 116 can determine the interface configuration of the content 210 that the HUD controller 122 provides to the display panel 104 as image data. In such instances, the current monitoring application 116 can determine the display area ratio associated with the interface configuration and an expected amount of current that a properly-functioning display panel 104 draws when displaying the content 210. The current monitoring application 116 can then set a threshold value based on the expected amount of current, where values exceeding the threshold value can indicate that the display panel 104 is drawing a larger amount of current than expected.

Monitoring Amount of Current Drawn to Detect a Display Malfunction

FIG. 3 is a diagram of an example lookup table included in the HUD system 100 of FIG. 1, according to various embodiments of the present disclosure. As shown, and without limitation, the lookup table 300 includes, without limitation, an interface configuration field 302, a display area ratio field 304, a threshold value field 306, and entries 312-316.

In various embodiments, the computing device 110 and/or the current monitoring unit 132 can store a lookup table 300 that maps values for specific interface configurations to various threshold values to compare with the current measurements. In various embodiments, the lookup table 300 can include data determined by using the HUD system 100 to display content 210 according to representative interface configurations and measuring and recording an average amount of current that the display panel 104 draws when displaying various interface configurations. For each interface configuration, the device can determine a threshold value, where current measurements exceeding the determined threshold value indicate that the display panel 104 is drawing more current than expected.

In various embodiments, the current monitoring application 116 can use the lookup table 300 to search for an entry containing a first value and use the entry to identify a corresponding value. For example, the current monitoring application 116 can use the specific interface configuration the HUD system 100 is displaying to identify a specific entry and use the entry to identify a corresponding display area ratio and/or a corresponding threshold value. In another example, the current monitoring application 116 can determine a specific display area ratio of the content 210 the HUD system 100 is displaying. In such instances, the current monitoring application 116 can identify an entry that includes the specific display area ratio and determine the corresponding interface configuration and/or the corresponding threshold value.

The interface configuration field 302 indicates a specific configuration of the interface that is provided in the light pattern 152 as content 210. For example, the entry 312 includes a partial interface configuration. In such instances, the interface configuration of "partial" indicates that the display panel 104 is showing content 210 in an interface that includes a subset of all available indicators. For example, when displaying the partial interface configuration, the display panel 104 can display a subset of indicators, such as the fuel gauge indicator 218 and the navigation direction indicator 216 that cover a smaller portion of the overall display area. The partial interface configuration has a corresponding lower display area ratio and draws a lower amount of current. In such instances, the current monitoring application 116 can use a smaller threshold value to compare with current measurements in order to determine whether the display panel 104 is malfunctioning.

In another example, the entry 314 includes a full interface configuration. In such instances, the interface configuration of "full" indicates that the display panel 104 is showing content 210 in an interface that includes all available indicators. The full interface configuration has a corresponding higher display area ratio and draws a higher amount of current. In such instances, the current monitoring application 116 can use a higher threshold value to compare with current measurements in order to determine whether the display panel 104 is malfunctioning.

The display area ratio field 304 indicates a ratio of the total display area that is occupied with overlays when displaying content 210. In various embodiments, the display panel 104 can consume draw more current when the display area ratio is higher. In some embodiments, the display area ratio can indicate that the display panel 104 is at least partially malfunctioning. In one example, the current monitoring application 116 can use the lower threshold value for the partial interface configuration to determine that the display panel 104 is at least partially malfunctioning when the current measurement exceeds 3.3 mA. In another example, the entry 316 can includes a white configuration. In such instances, the interface configuration of "white" indicates that the display panel 104 is showing a substantially white overlay, indicating a substantial malfunction. The white configuration can have the highest display area ratio and draws the highest amount of current. In such instances, the current monitoring application 116 can use a maximum threshold value to determine whether the display panel 104 is malfunctioning.

Figure 4:
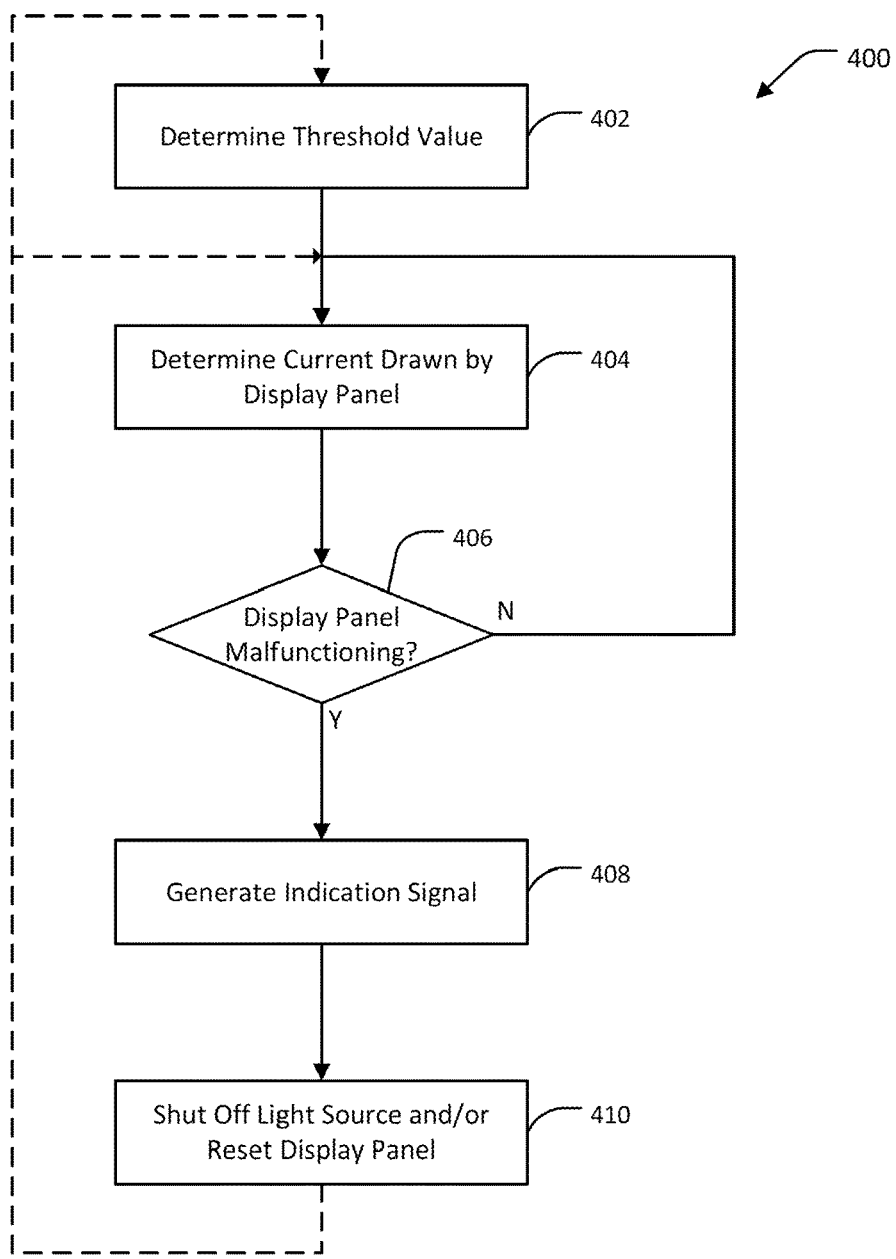
FIG. 4 is a flowchart of method steps for detecting a malfunctioning display based on a measured current consumption of a display panel, according to various embodiments of the present disclosure.

FIG. 4 is a flowchart of method steps for detecting a malfunctioning display based on a measured current consumption of a display panel, according to various embodiments of the present disclosure. Although the method steps are described with reference to the embodiments of FIGS. 1-3, persons skilled in the art will understand that any system configured to implement the method steps, in any order, falls within the scope of the present disclosure.

As shown, the method 400 begins at step 402, where the current monitoring application 116 determines the threshold value. In various embodiments, the current monitoring application 116 can set the threshold value to a default value. For example, the current monitoring application 116 can set the default value based on a maximum amount of current drawn by the display panel 104 (e.g., 90% of maximum). In such instances, the current monitoring application can set the threshold value to the default value to determine whether the display panel 104 is experiencing a substantial malfunction.

In some embodiments, the current monitoring application 116 can determine the threshold value by computing the threshold value based on an interface configuration. For example, the current monitoring application 116 can receive a message from the HUD controller 122 that indicates the particular interface configuration that the display panel 104 is providing as content 210. In such instances, the current monitoring application 116 can determine the display area ratio for the interface configuration and/or from a display area ratio determined based on the content 210 to determine the expected amount of current that the display panel 104 is to draw. The current monitoring application 116 can then set the threshold value as a function of the expected amount of current drawn (e.g., set the threshold value to a larger value than the expected amount of current drawn, such as 110% of the expected amount of current drawn). In some embodiments, the threshold value can be set to be significantly higher than the average value for the amount of current drawn when the display panel 104 is displaying a particular interface configuration. For example, the display panel 104 can draw an average current of 4 mA when displaying a given interface configuration; in such instances, the current monitoring application 116 can set the threshold value for the given interface configuration to 4.4 mA.

In some embodiments, the current monitoring application 116 can refer to a lookup table 300 when determining the threshold value. For example, upon determining the particular interface configuration that the display panel 104 is attempting to display, the current monitoring application 116 can refer to the lookup table to identify a specific entry for the particular interface configuration from the set of entries 312-316. Upon identifying the particular entry, the current monitoring application 116 can retrieve the threshold value that is included in the entry. In another example, example, the current monitoring application 116 can determine a specific display area ratio of the content 210 that is being displayed. In such instances, the current monitoring application 116 can identify an entry that includes the specific display area ratio and determine the corresponding interface configuration and/or the corresponding threshold value.

At step 404, the current monitoring application 116 determines the amount of current drawn by the display panel 104. In various embodiments, a current monitoring unit 132 can measure the amount of current that the display panel 104 draws. For example, the current monitoring unit 132 can be a sensor and/or integrated circuit that measures the current that the power source 130 transmits to the display panel 104. In such instances, the current monitoring unit 132 can transmit or otherwise provide the current measurement to the current monitoring application 116 as an analog input, digital input, a message, and/or the like. Alternatively, in some embodiments, the current monitoring unit 132 can measure the amount of power that the display panel 104 consumes.

At step 406, the current monitoring application 116 determines whether the display panel is malfunctioning. In various embodiments, the current monitoring application 116 can compare the measured current to the threshold value. When the current monitoring application 116 determines that the measured current does not exceed the threshold value, the current monitoring application 116 determines that the display panel 104 is operating correctly and returns to step 404. Otherwise, when the current monitoring application 116 exceeds the threshold value, the current monitoring application 116 determines that the display panel 104 is malfunctioning and proceeds to step 408.

At step 408, the current monitoring application generates an indication signal. In various embodiments, the current monitoring application can respond to the determination that the display panel 104 is malfunctioning by generating an indication signal. In such instances, the indication signal can indicate an overcurrent event. The current monitoring application can transmit the indication signal to the HUD controller 122.

At step 410, the HUD controller 122 shuts off power to the light source 102 and/or resets the display panel 104. In various embodiments, the HUD controller 122 can respond to the indication signal by generating a set of commands. The set of commands can include a shutdown command to stop providing power to the light source 102. The set of commands can also include a reset command to reset the display panel 104. In some embodiments, the HUD controller 122 can transmit the shutdown command to the light source driver 134 to stop the light source 102 from receiving power. Additionally or alternatively, the HUD controller 122 can transmit the reset command to the power source 130 and/or an electronic control unit to stop the display panel 104 from drawing a current. In some embodiments, upon shutting off power to the light source 102 and/or resetting the display panel 104, the HUD controller 122 can cause the current monitoring application 116 to return to step 404 to determine the current drawn by the display panel 104. Alternatively, in some embodiments, the HUD controller 122 can cause the current monitoring application 116 to return to step 402 to determine the threshold value (e.g., determine to keep the same threshold value or switch to a new threshold value).

In sum, a current monitoring unit continually monitors the operation of one or more display panels. The current monitoring unit measures a current that a display panel draws from a power source when displaying an image. A current monitoring application receives the measured current from the current monitoring unit and compares the current to a threshold value associated with the display panel correctly displaying the image. In some embodiments, the threshold value can be a single pre-defined value. In some embodiments, the threshold value can be selected based on a specific interface configuration associated with the content of the image. When the current monitoring application determines that the measured current is above the threshold value, the current monitoring application determines that the display unit is malfunctioning. The current monitoring application responds to the determination by generating an indication signal transmitting the indication signal to a HUD controller. The HUD controller responds to the indication message by generating a command to shut off a light source associated with the display panel. In some embodiments, the HUD controller can also initiate a reset of the display panel in order to correct the malfunction.

At least one technological advantage of the disclosed techniques relative to the prior art is that, with the disclosed techniques, a HUD system can closely monitor critical failures associated with functionalities of a display panel in a manner that does not require external sensors, such as multiple image sensors. As a result, a HUD system that implements the disclosed techniques can effectively determine malfunctions quicker and in a less processor-intensive manner while avoiding problems associated with detecting discrepancies between images. These technical advantages provide one or more technological advancements over prior art approaches.

1. In various embodiments, a computer-implemented method comprises measuring a current drawn by a display panel, determining whether the current exceeds a threshold value, and upon determining that the current exceeds the threshold value, causing a light source associated with the display panel to shut off.
2. The computer-implemented method of clause 1, further comprising causing the display panel to reset.
3. The computer-implemented method of clause 1 or 2, further comprising determining a configuration of an interface that the display panel is displaying, and selecting the threshold value based on the configuration.
4. The computer-implemented method of any of clauses 1-3, where selecting the threshold value comprises using a lookup table.
5. The computer-implemented method of any of clauses 1-4, further comprising determining a ratio based on (i) a portion of a total display area that is covered by a first set of images, and (ii) the total display area, and selecting the threshold value based on the ratio.
6. The computer-implemented method of any of clauses 1-5, further comprising determining a maximum current that the display panel draws, determining a fraction of the display panel that includes a set of display images, and setting the threshold value based on the maximum current and the fraction.
7. The computer-implemented method of any of clauses 1-6, further comprising setting the threshold value based on a maximum amount of current that the display panel is expected to draw.
8. The computer-implemented method of any of clauses 1-7, where causing the light source to shut off comprises sending a command to the light source.
9. In various embodiments, a system comprises a memory storing a monitoring application, and a current measuring circuit that measures a current drawn by a display panel, and a processor coupled to the memory that executes the monitoring application by performing the steps of receiving, from the current measuring circuit, a current measurement corresponding to the current drawn by the display panel, determining whether the current measurement is larger than a threshold value, and upon determining that the current measurement is larger than the threshold value, causing a light source associated with the display panel to shut off.
10. The system of clause 9, where the display panel comprises a liquid crystal display (LCD) panel providing a set of heads-up display (HUD) images.
11. The system of clause 9 or 10, where light projected through the display panel creates an image to be reflected off at least a portion of a windshield of a vehicle.
12. The system of any of clauses 9-11, further comprising a power management integrated circuit that includes at least the current measuring circuit.
13. The system of any of clauses 9-12, further comprising a monitoring circuit that measures the current, wherein the monitoring circuit is separate from the display panel and a power source that provides the current to the display panel.
14. The system of any of clauses 9-13, where the light source comprises a light-emitting diode (LED) array operatively coupled to the display panel.
15. The system of any of clauses 9-14, further comprising an LED driver that responds to a first command to shut off the LED array by stopping a supply of power to the LED array, wherein the processor further executes the monitoring application by performing the steps of receiving a message indicating that the current exceeds the threshold value, and in response to receiving the message, generating the first command.
16. The system of any of clauses 9-15, where the processor further executes the monitoring application by performing the step of upon determining that the current measurement is larger than the threshold value, generating a command for the display panel to reset.
17. In various embodiments, one or more non-transitory computer-readable media stores instructions that, when executed by one or more processors, cause the one or more processors to perform the steps of measuring a power consumed by a display panel, determining whether the power exceeds a threshold value, and upon determining that the power exceeds the threshold value, causing a light source associated with the display panel to shut off.
18. The one or more non-transitory computer-readable media of clause 17, where the steps further comprise determining a ratio based on (i) a portion of a total display area that is covered by a first set of images, and (ii) the total display area, and selecting the threshold value based on the ratio.
19. The one or more non-transitory computer-readable media of clause 17 or 18, where the steps further comprise determining a maximum current that the display panel draws, determining a fraction of the display panel that includes a set of display images, and setting the threshold value based on the maximum current and the fraction.
20. The one or more non-transitory computer-readable media of any of clauses 17-19, where the steps further comprise setting the threshold value based on a maximum amount of current that the display panel is expected to draw.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
determining, from a plurality of interfaces, a first interface that a display panel is displaying;
determining a threshold current value based on the first interface;
measuring a first current drawn by the display panel;
determining whether the first current exceeds the threshold current value; and
upon determining that the first current exceeds the threshold current value,
causing a second current providing power to a light source associated with the display panel to be shut off.

2. The computer-implemented method of claim 1, further comprising causing the display panel to reset.

3. The computer-implemented method of claim 1, wherein determining the threshold current value comprises using a lookup table.

4. The computer-implemented method of claim 1, wherein:
determining the first interface comprises determining a ratio based on:
(i) a portion of a total display area that is covered by a first set of images, and
(ii) the total display area; and
determining the threshold current value based on the first interface comprises selecting the threshold current value based on the ratio.

5. The computer-implemented method of claim 1, further comprising:
determining a maximum current that the display panel draws;
determining a fraction of the display panel that includes a set of display images; and
setting the threshold current value based on the maximum current and the fraction.

6. The computer-implemented method of claim 1, further comprising setting the threshold current value based on a maximum amount of current that the display panel is expected to draw.

7. The computer-implemented method of claim 1, wherein causing the light source to shut off comprises sending a command to the light source.

8. A system comprising:
a memory storing a monitoring application; and
a current measuring circuit that measures a first current drawn by a display panel; and
a processor coupled to the memory that executes the monitoring application by performing the steps of:
determining, from a plurality of interfaces, a first interface that the display panel is displaying;
determining a threshold current value based on the first interface;
receiving, from the current measuring circuit, a first current measurement corresponding to the first current drawn by the display panel;
determining whether the first current measurement is larger than the threshold current value; and
upon determining that the first current measurement is larger than the threshold current value, causing a second current providing power to a light source associated with the display panel to be shut off.

9. The system of claim 8, wherein the display panel comprises a liquid crystal display (LCD) panel providing a set of heads-up display (HUD) images.

10. The system of claim 9, wherein light projected through the display panel creates an image to be reflected off at least a portion of a windshield of a vehicle.

11. The system of claim 8, further comprising a power management integrated circuit that includes at least the current measuring circuit.

12. The system of claim 8, further comprising:
a monitoring circuit that measures the first current,
wherein the monitoring circuit is separate from the display panel and a power source that provides the first current to the display panel.

13. The system of claim 8, wherein the light source comprises a light-emitting diode (LED) array operatively coupled to the display panel.

14. The system of claim 13, further comprising:
an LED driver that responds to a first command to shut off the LED array by stopping a supply of power to the LED array,
wherein the processor further executes the monitoring application by performing the steps of:
receiving a message indicating that the first current exceeds the threshold current value, and
in response to receiving the message, generating the first command.

15. The system of claim 8, wherein the processor further executes the monitoring application by performing the step of upon determining that the first current measurement is larger than the threshold current value, generating a command for the display panel to reset.

16. One or more non-transitory computer-readable media storing instructions that, when executed by one or more processors, cause the one or more processors to perform the steps of:
determining, from a plurality of interfaces, a first interface that a display panel is displaying;
determining a threshold current value based on the first interface;
measuring a first power consumed by the display panel;
determining whether the first power exceeds the threshold current value; and
upon determining that the first power exceeds the threshold current value, causing a second current providing power to a light source associated with the display panel to be shut off.

17. The one or more non-transitory computer-readable media of claim 16, wherein:
  determining the first interface comprises determining a ratio based on:
    (i) a portion of a total display area that is covered by a first set of images, and
    (ii) the total display area; and
  determining the threshold current value based on the first interface comprises selecting the threshold current value based on the ratio.

18. The one or more non-transitory computer-readable media of claim 16, wherein the steps further comprise:
  determining a maximum current that the display panel draws;
  determining a fraction of the display panel that includes a set of display images; and
  setting the threshold current value based on the maximum current and the fraction.

19. The one or more non-transitory computer-readable media of claim 16, wherein the steps further comprise setting the threshold current value based on a maximum amount of current that the display panel is expected to draw.

\* \* \* \* \*